United States Patent
Ohanian, III

(10) Patent No.: US 8,104,707 B1
(45) Date of Patent: Jan. 31, 2012

(54) X-VANE CONFIGURATION IN A DUCTED-FAN AERIAL VEHICLE

(75) Inventor: Osgar John Ohanian, III, Blacksburg, VA (US)

(73) Assignee: Honeywell International Inc., Morristown, NJ (US)

( * ) Notice: Subject to any disclaimer, the term of this patent is extended or adjusted under 35 U.S.C. 154(b) by 511 days.

(21) Appl. No.: 12/190,516

(22) Filed: Aug. 12, 2008

(51) Int. Cl.
B64C 29/00 (2006.01)
(52) U.S. Cl. .................................... 244/23 C
(58) Field of Classification Search .............. 244/12.5, 244/23 D, 23 C
See application file for complete search history.

(56) References Cited

U.S. PATENT DOCUMENTS

| | | | |
|---|---|---|---|
| 2,929,580 A * | 3/1960 | Ciolkosz | 244/12.5 |
| 2,968,453 A * | 1/1961 | Bright | 244/12.5 |
| 3,584,810 A | 6/1971 | Velton | |
| 4,071,207 A * | 1/1978 | Piasecki et al. | 244/23 D |
| 4,795,111 A | 1/1989 | Moller | |
| 4,828,203 A * | 5/1989 | Clifton et al. | 244/12.3 |
| 5,505,407 A * | 4/1996 | Chiappetta | 244/2 |
| D459,286 S | 6/2002 | Miralles et al. | |
| 6,450,445 B1 * | 9/2002 | Moller | 244/23 A |
| 6,502,787 B1 | 1/2003 | Barrett | |
| 6,550,715 B1 | 4/2003 | Reynolds et al. | |
| 6,604,706 B1 | 8/2003 | Bostan | |
| 6,817,570 B2 | 11/2004 | Yoeli | |
| 7,472,863 B2 * | 1/2009 | Pak | 244/12.5 |
| 2004/0167682 A1 | 8/2004 | Beck et al. | |
| 2007/0034739 A1 | 2/2007 | Yoeli | |

* cited by examiner

Primary Examiner — Tien Dinh
Assistant Examiner — Keith L Dixon
(74) Attorney, Agent, or Firm — Shumaker & Sieffert, P.A.

(57) ABSTRACT

Disclosed herein is a propulsion system, which may be implemented in an air-vehicle, such as a ducted-fan organic air-vehicle. The propulsion system comprises (a) a power source, (b) a fan located within a duct and powered by the power source, (c) a plurality of vanes arranged in an x-clocked configuration and configured to produce control moments from the flow generated by the fan. The maximum control moments, which can be created by the vanes in the x-clocked configuration, are substantially oriented along the flight axes of the air-vehicle or the principle axis of the maximum moment of inertia.

19 Claims, 6 Drawing Sheets

X-VANE CONFIGURATION IN A DUCTED-FAN AERIAL VEHICLE

GOVERNMENT RIGHTS

The United States Government may have acquired certain rights in this invention pursuant to Contract No. MDA972-01-9-0018 awarded by the Defense Advanced Research Projects Agency (DARPA).

FIELD OF THE INVENTION

The invention involves ducted-fan air vehicles, and in particular, the arrangement of vanes for ducted-fan air vehicles.

BACKGROUND

Ducted-fan air-vehicles are known for their superior stationary aerodynamic hovering performance, three-dimensional precision position hold, low speed flights, and precision vertical take-off and landing (VTOL) capabilities. In addition, the duct provides protection from contact with the rotating fan blade close in operations.

As such, ducted-fan air-vehicles, and in particular, unmanned aerial vehicles (UAVs) implementing ducted-fans, are increasingly being deployed in battlefield scenarios. For instance, typical UAV operations may include reconnaissance and surveillance, navigating for troops and ground vehicles, and non-line of sight targeting. Accordingly, a UAV may be configured to detect enemy troops and vehicles in areas where ground forces (or even aerial forces) lack a direct line-of-sight. In effect, UAVs may become "sentinels" for troops as they move into enemy territory.

Ducted-fan UAVs may be designed to perform autonomous missions that generally require the UAV to launch vertically, fly along a pre-planned flight plan, and land vertically. For example, at some point while flying a mission, the ducted-fan UAV may be expected to perform "perch and stare" observations. Perch and stare observations require the UAV to land vertically, perform observations (possibly for an extended period of time with engine shutdown), and takeoff vertically. To control the direction of flight ducted-fan UAVs are generally equipped with vanes that serve to create control moments generated by deflecting the high speed air flow exiting the ducted fan.

SUMMARY

Numerous design parameters factor into the performance of ducted-fan UAV vanes. For example, performance can be affected by the total number of vanes, the span to chord ratio (aspect ratio) of the vanes, the spacing of the vanes, the airfoil selection for the vanes, the planform of the vanes, whether the vanes are flapped or rigid, the orientation of vanes with respect to each other, the axial location of the vanes, how the vanes are attached to the UAV, the ground effect (i.e., the minimum distance between the ground and closest point on the vanes), etc.

The performance of a UAV is also affected by the weight of UAVs. Lighter UAVs generally require less lift to remain airborne, are typically more efficient, and may be more maneuverable. Therefore, vane designs that increase the maximum moment, without increasing the weight of the vanes (and thus the weight of the UAV) are particularly desirable.

Accordingly, disclosed herein is a propulsion system for an air-vehicle. The propulsion system may be implemented in various types of air-vehicles such as unmanned air-vehicles (UAVs) and in particular a ducted-fan organic air-vehicles (OAVs). The propulsion system comprises (a) a power source, (b) a ducted-fan that is powered by the power source and configured to create an air flow through the duct, and (c) a plurality of vanes configured to produce control moments by deflecting the air flow created by the ducted-fan, wherein the vanes are arranged in an x-clocked configuration. The power source may be a gas engine or an electric motor.

The air-vehicle in which the propulsion system is implemented may have an associated direction of flight, which defines a set of flight axes. In addition, the x-clocked configuration may define a set of vane axes, which are oriented at approximately forty-five degrees to the flight axes. In an exemplary embodiment, the propulsion system includes four vanes arranged perpendicular to each other such that each vane is aligned with a vane axis. With this configuration, the vanes may create control moments such that a combined control moment may be a maximum moment oriented along a flight axis.

In another aspect, a ducted-fan air-vehicle is disclosed. The ducted-fan air-vehicle comprises (a) a power source, (b) a duct, (c) a fan located within the duct and powered by the power source, wherein the fan is configured to create air flow through the duct, and (d) a plurality of vanes arranged in an x-clocked configuration, wherein the vanes are configured to produce control moments by deflecting the air flow through the duct. The vanes may be flapped, such that each flapped vane is moveable to control deflection of the air flow through the ducted-fan.

The ducted-fan air-vehicle may further comprise an avionics system to control the flight of the ducted-fan air-vehicle. The avionics system may be configured to orient the vehicle around a forward direction of flight, wherein the forward direction of flight defines a set of flight axes. The flight axes comprise a pitch-axis, a roll-axis, and a yaw-axis, wherein the pitch-axis is oriented substantially perpendicular to the forward direction of flight, and is the primary axis the vehicle rotates about while in forward flight. Therefore it is desirable to have as much control authority (maximum control moment) to affect rotations about this pitch axis. As such, the plurality of vanes arranged in an x-clocked configuration may comprise four vanes arranged perpendicular to each other such that each vane is aligned with a vane axis, wherein each vane axis is oriented at substantially forty-five degrees to a flight axis.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

In an exemplary embodiment, the ducted-fan air-vehicle may take the form of a UAV, and in particular, may take the form of an Organic Air-vehicle (OAV). Currently, the U.S. government has funded development of two classes of OAVs—smaller class I OAVs and larger class II OAVs. The invention may be described herein by way of example, with reference to a class II OAV. However, it will be understood by one skilled in the art that the invention can extend to class I OAVs, as well as other types of OAVs, UAVs, and ducted-fan air-vehicles.

Figure 1:
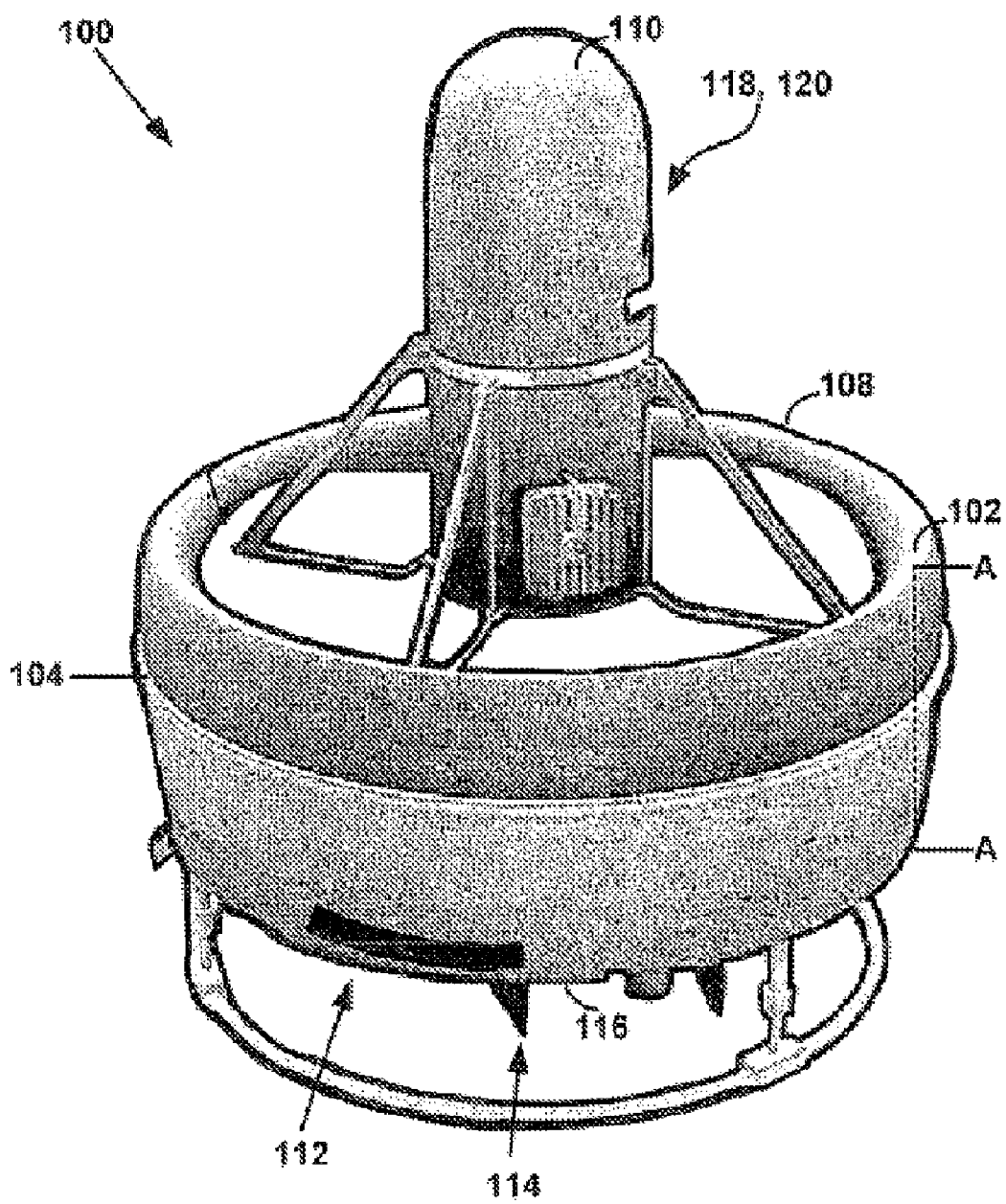
FIG. 1 is a pictorial representation of a Class II OAV.

FIG. 1 is a pictorial representation of a Class II OAV 100. The OAV 100 includes an air data system, a duct 104, and a fan not shown) located within the air duct 104. Additionally, the OAV 100 may have center body 110. The center body 110 may be a housing that contains other components of the OAV 100. The center body 110 may contain an engine for powering the OAV 100. The center body 110 may contain additional components for OAV operation, such as a processor 118 for the air data system 102 and an avionics system 120.

The OAV 100 may also include additional components, such as the avionics system 120. The avionics system 120 may be located in the center body 110 of the OAV 100. The avionics system 120 may control the OAV 100 by controlling the altitude, positioning, and forward speeds of the OAV 100. The avionics system 120 may control the aircraft using various inputs. For instance, the avionics system 120 may use inputs, such as inertial sensors, GPS, and airflow speed and direction, in order to control the OAV 100. The air data system 102 may provide such inputs to the avionics system 120.

The air data system 102 may also determine the forces the airflow generates on the OAV 100, and these forces may also utilized by the avionics system 120 for control of the OAV 100. Additionally, the avionics system 120 may utilize inputs from a GPS sensor and/or an inertial sensor. The air data system 102 preferably includes the processor 118. Alternatively, the air data system 102 may include multiple processors. The processor 118 may be any combination of hardware, firmware, and/or software operable to interpret and execute instructions, typically from a software application. For example, the processor 118 may be a microcontroller, a microprocessor, or an application-specific integrated circuit (ASIC). The processor 118 may be located in the center body 110 of the OAV 100. Alternatively, the processor 118 could be located in the air duct 104 of the OAV 100.

The processor 118 of the air data system 102 is preferably operable to calculate the air data surrounding the air-vehicle 100. For instance, the processor 118 is operable to receive pressure data from the plurality of pressure sensors and calculate direction and magnitude of airflow, such as wind gusts and wind shears, surrounding the air-vehicle 100. The processor 118 of the air data system 102 may also be operable to calculate the forces of the airflow on the air-vehicle.

The OAV 100 may also include a stator assembly 112 and vanes 114. The stator assembly 112 and vanes 114 may be located under the fan located within the duct 104. The stator assembly 112 may be located just under the fan in the duct 104 and may operate to flow swirl aft of the fan (i.e., straightening the swirling air flow produced by the fan). The vanes 114 may also be placed under the fan, and may operate to create control moments for the OAV 100. For instance, the vanes 114 may be placed slightly below an exit section 116 of the air duct 104. The OAV 100 may contain fixed and/or movable vanes.

The vanes of OAV 100 have an associated set of maximum moments. A maximum moment is the moment created when the vanes are oriented such that the net effect of the moments created by all the vanes has a maximum magnitude in a single direction (i.e., moments in other directions are offset by equal and opposite moments). In a configuration with four vanes oriented perpendicular to each other, the resulting maximum moments are also perpendicular to each other.

The maximum moment of the vanes defines the strength of the vanes to withstand outside forces and moments. As a result, the maximum moment is a factor in holding a ducted-fan air-vehicle in equilibrium, battling wind gusts, performing aerial maneuvers, etc. Therefore, vane designs resulting in a larger maximum moment are desirable.

Figure 2:
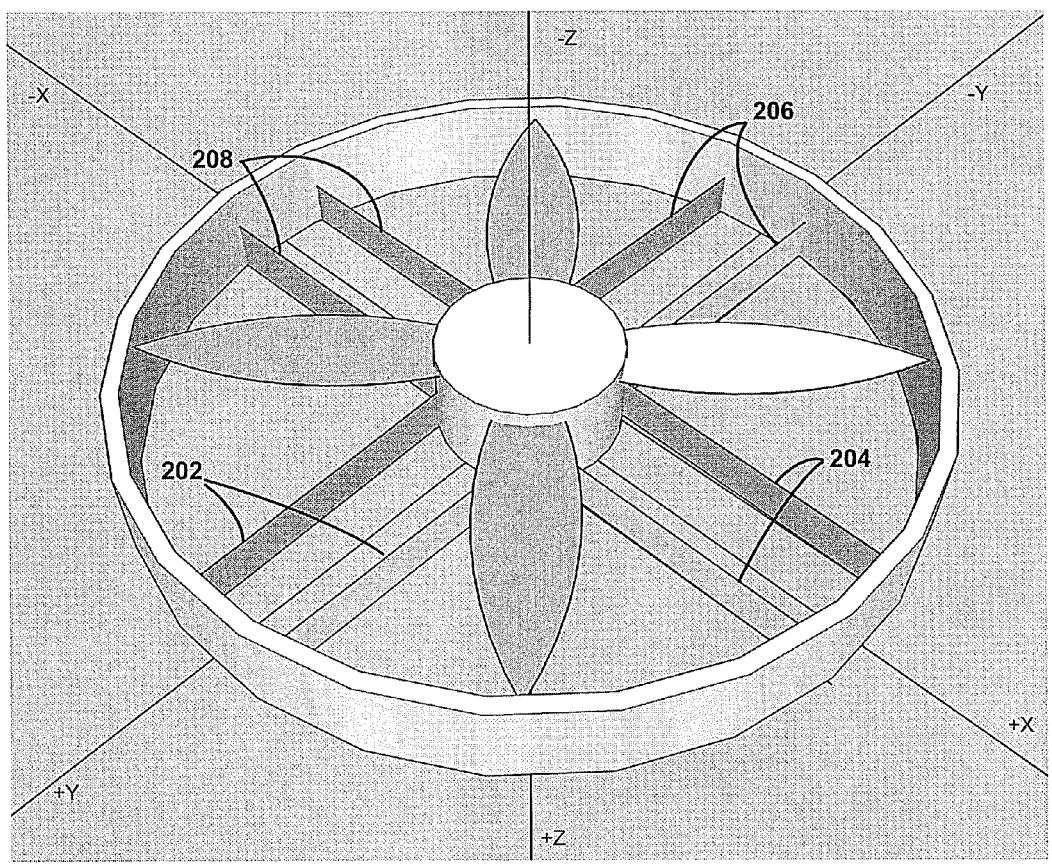
FIG. 2 illustrates a simplified ducted-fan propulsion system.

FIG. 2 illustrates a simplified ducted-fan propulsion system. In FIG. 2, each "vane" 202-208 is shown as a set of two blades. Therefore, each set of vanes may simply be referred to as a "vane" herein. Deflecting a vane (e.g. deflecting one set of vanes) creates a moment that is aligned with or parallel to the vane. Thus, the moments created by the each vane 202-208 may be treated as perpendicular to each other. As such, the vanes define a set of axes, which are aligned with the moments created by the vanes. Specifically, they define the $X^v$-axis, $Y^v$-axis, and $Z^v$-axis (collectively referred to as the "vane axes").

To produce a maximum moment, all four vanes 202-208 may be actuated resulting in two independent moments being produced along the X and Y vane axes. Vector addition of the moments along the X and Y vane axes results in a net control moment that is approximately forty-five degrees between the X and Y vane axes, with a magnitude that is approximately 1.41 (i.e., the square root of two) times that of individual moments. This resulting moment, at forty-five degrees to the vane axes, is one of the maximum moments for this 4-vane configuration. Due to deflecting the vanes in different directions, a maximum moment can be created in each of the four quadrants of the vane axes.

Figure 3A:
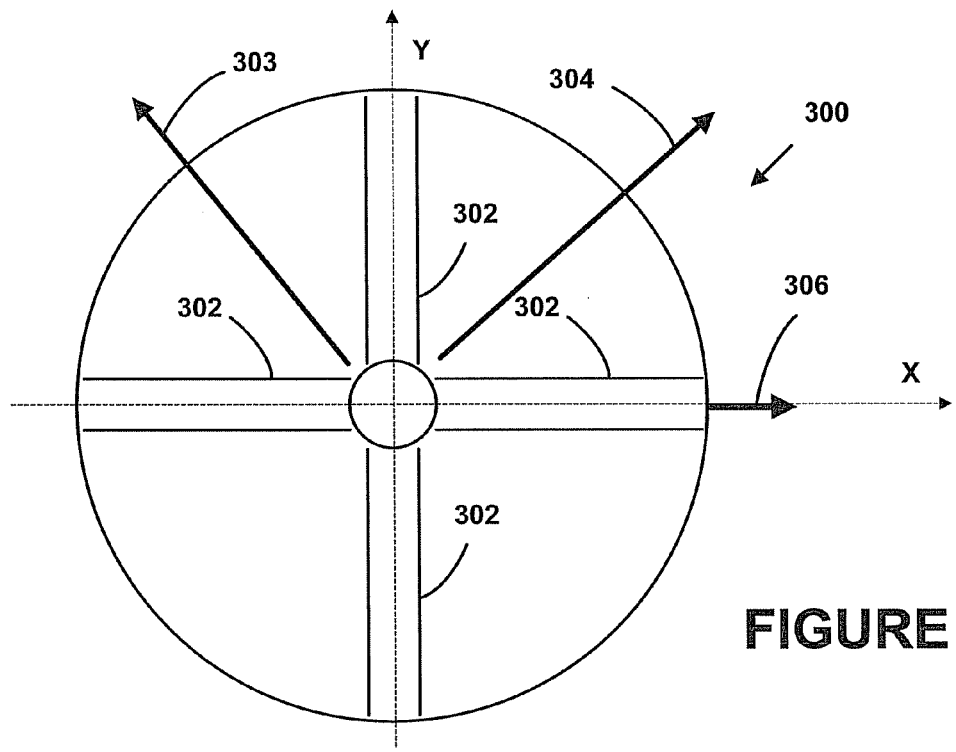
FIG. 3A illustrates a simplified cross-section of an OAV propulsion system.
Figure 3B:
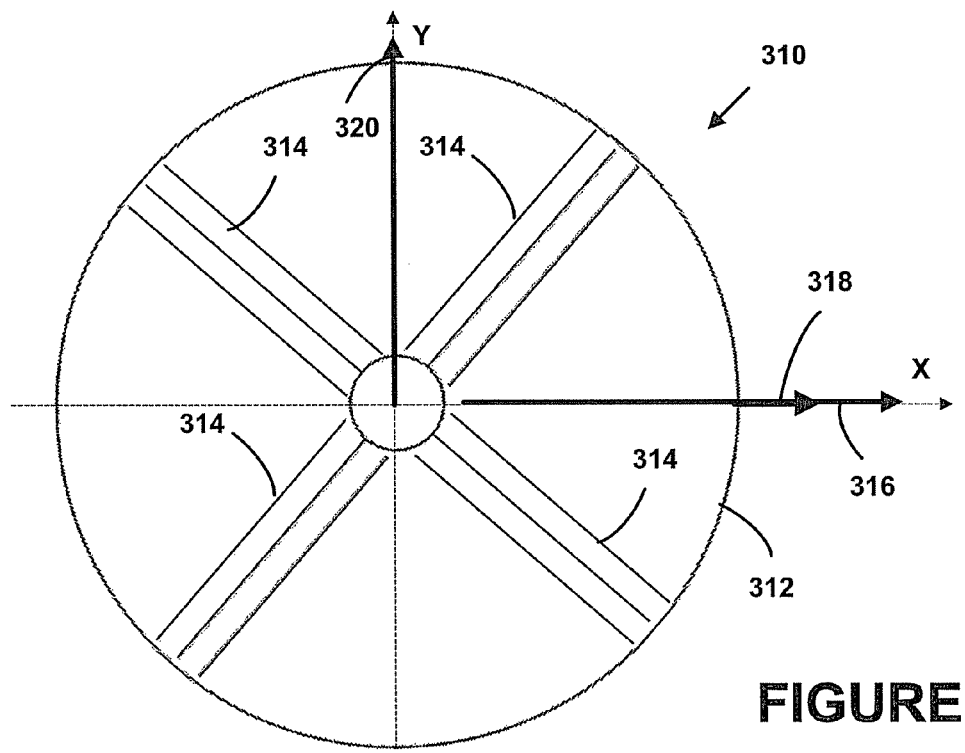
FIG. 3B illustrates another simplified cross-section of an OAV propulsion system.

FIGS. 3A and 3B each illustrate a cross-section of a ducted-fan OAV that includes a propulsion system. The propulsion system is preferably a ducted fan. As in FIG. 2, each "vane" in FIGS. 3A and 3B is shown as having a set of two blades, which may simply be referred to as a "vane". FIGS. 3A and 3B also indicate a general direction of flight 306 and 316, respectively. The direction of flight, like the vanes, may be thought of as defining a set of perpendicular axes (i.e., the $X^f$-axis or roll-axis, $Y^f$-axis or pitch-axis, and $Z^f$-axis or yaw-axis, collectively referred to as the "flight axes"). Therefore, in the configuration shown in FIG. 3A, the flight axes are aligned with the vane axes. In FIG. 3B, however, the flight axes are oriented at approximately forty-five degrees to the vane axes. More specifically, in FIG. 3B, the $X^v$-axis and $Y^v$-axis are rotated by forty-five degrees as compared to the roll-axis and pitch-axis of flight. The $Z^v$-axis and yaw-axis, however, remain generally aligned in both FIGS. 3A and 3B.

FIG. 3A illustrates a simplified cross-section of an OAV propulsion system 300 in which the vanes 302 are arranged in a cross-clocked configuration (also referred to as a "plus-clocked configuration"). When the vanes are cross-clocked, the vane axes are aligned with the flight axes. Therefore, each maximum moment of vanes 302, such as maximum moment 303 or 304, has a direction that is at approximately 45 degrees to the flight axes. For instance, the maximum moment 303 is oriented at approximately 45 degrees to the $Y^f$-axis (in the positive direction), while maximum moment 304 is oriented at approximately 45 degrees to the $Y^f$-axis (in the negative direction).

FIG. 3B illustrates a simplified cross-section of an OAV propulsion system 310 according to an exemplary embodiment. The propulsion system 310 includes duct 312, as well as four vanes 314. According to the exemplary embodiment, vanes 314 may be arranged in an x-clocked configuration (also referred to as an "x-configuration" or an "x-vane configuration"), rather than a plus-clocked configuration, so that the maximum control moment 318 is aligned with the general forward direction of flight 316, and maximum moment 320 is aligned with the pitch axis of flight. The direction or axis of the maximum moment of inertia (MOI) for the OAV may often be aligned with the pitch axis. As a result, the control authority increases in the axes of the direction of flight (i.e., along the $X^f$-axis and $Y^f$-axis).

Having a maximum moment aligned with the forward direction of flight may be particularly useful as OAVs evolve and are increasingly being equipped with gimbaled cameras and sensors. Gimbaled cameras and sensors can rotate, capture, identify, or locate targets in various directions from the OAV. When equipped with a gimbaled camera or sensor, the camera or sensor can acquire a target without the OAV itself rotating. As the need for an OAV to rotate diminishes, the OAV can remain oriented in the forward direction a greater percentage of the time, where the benefit of x-clocked vanes can be better realized. Additionally, these heavy sensors positioned far from the vehicle center of mass can substantially increase the moments of inertia and thereby decrease the control authority. Orienting the vanes in an x-orientation decreases this impact to the control authority.

In addition, while the control moment of an OAV is largely determined by vane size, there is a directional bias due to the maximum moment associated with the vane configuration. The largest moment of inertia (MOI) of the vehicle is usually aligned with one of the flight axes, such as the pitch-axis (Y-axis). The control authority of the vehicle, or the potential for angular acceleration due to vane deflection, is typically measured in these same flight axes. The angular acceleration is equal to the control moment imparted by the vanes divided by the MOI. Therefore, the axis corresponding to the largest moment of inertia has the lowest control authority. This minimum control authority is a limiting factor in the flight controls of the vehicle, and thus is often made a design metric for OAVs.

If the minimum vehicle control authority is a design criterion, x-clocking of the vanes allows the vanes to be as small and light as possible, which thus improves maneuverability of the OAV. Besides the weight savings in the vanes themselves, x-clocked vanes may be aligned with the struts and/or landing gear of the OAV, leveraging their existing structure and reducing the need for additional structural to support the vanes. X-clocked vanes may also provide an additional benefit of reducing downward field of view (FOV) blockage of sensors mounted on the front of the duct. Other benefits are also possible.

Figure 4A:
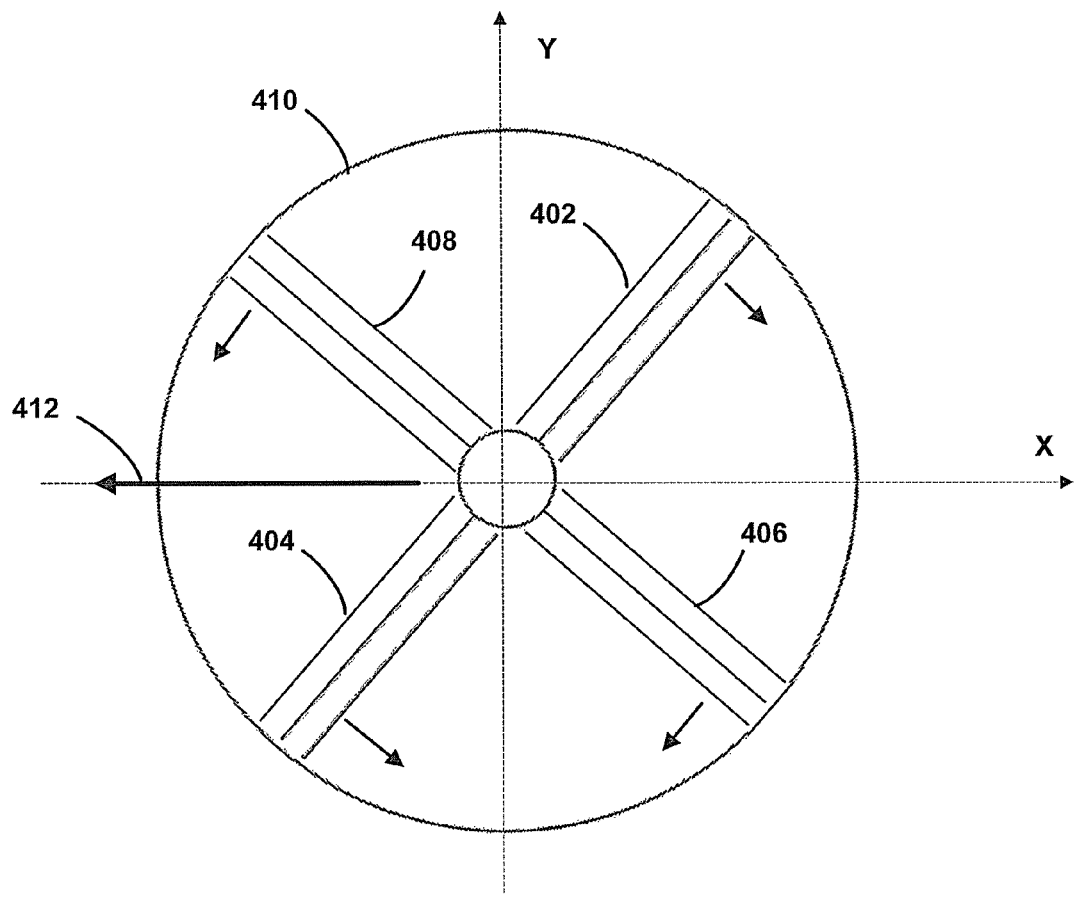
FIG. 4A is a diagram illustrating moments produced by x-clocked vanes.
Figure 4B:
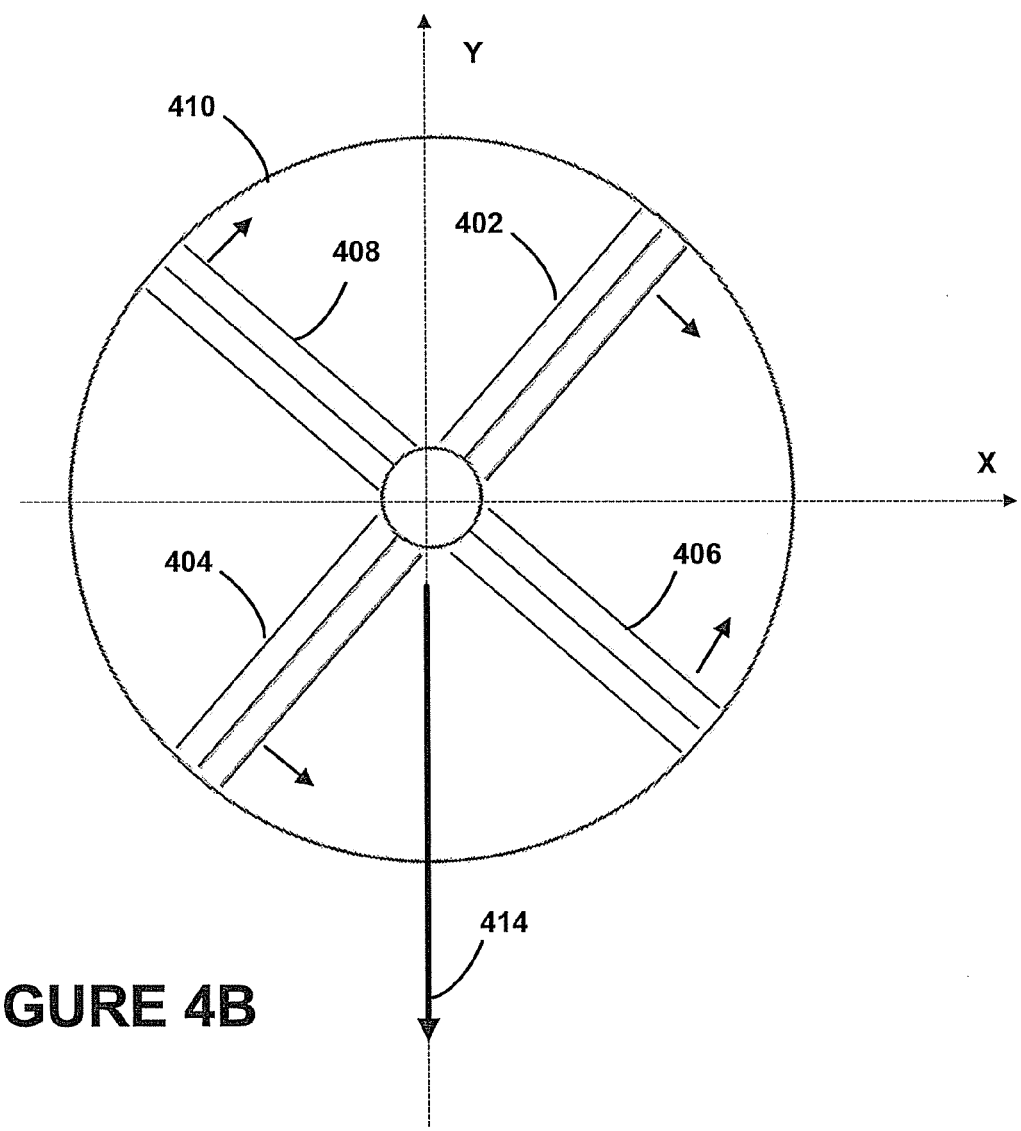
FIG. 4B is another diagram illustrating moments produced by x-clocked vanes.
Figure 4C:
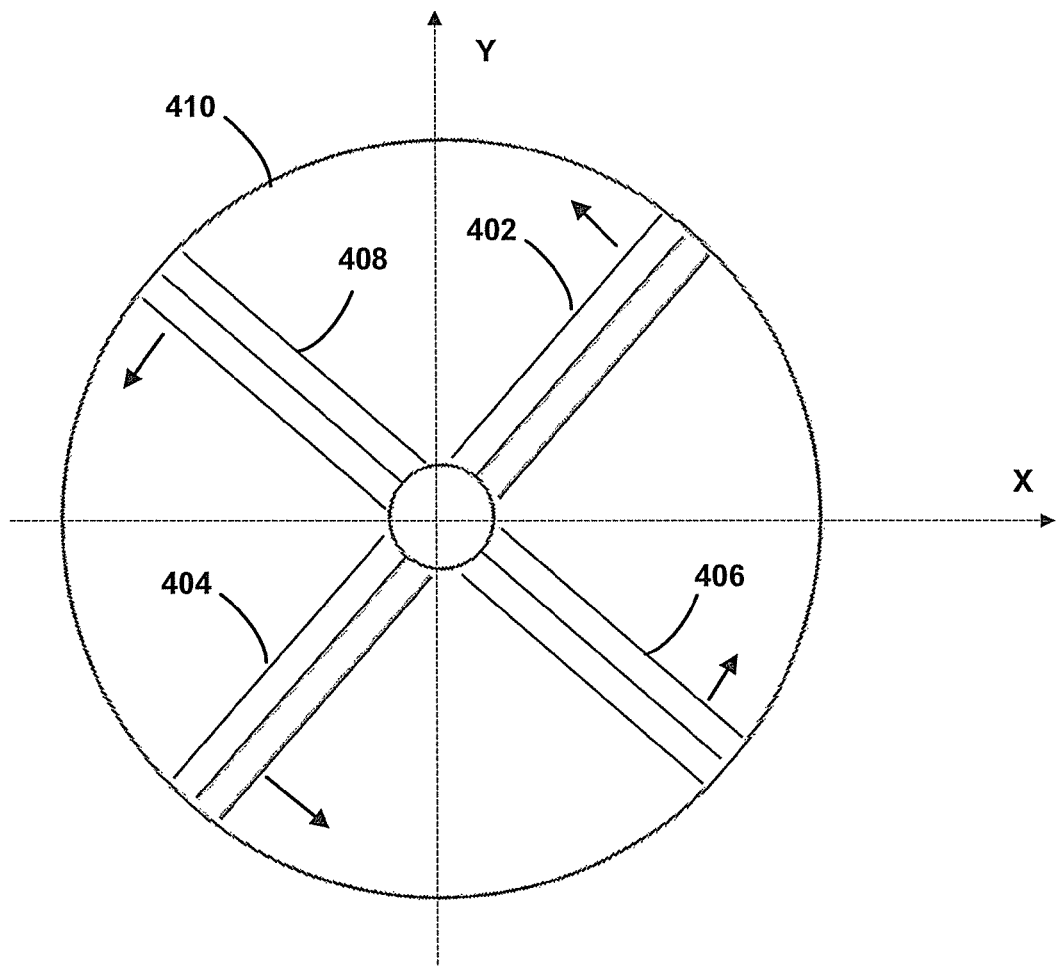
FIG. 4C is another diagram illustrating moments produced by x-clocked vanes.

FIGS. 4A-4C are diagrams illustrating moments produced by X-clocked vanes 402-408. Cumulatively, the x-clocked vanes 402-408 produce moments that are substantially oriented along one or more of flight axes (i.e., the roll-axis, pitch-axis, and/or yaw-axis). As air is forced through the duct 410 by the fan (not shown), each vane 402-408 may be moved, (i.e. deflected). In FIGS. 4A-4C, the arrows extending from the vanes illustrate the direction that the trailing edge of the vane moves during deflection (as viewed from below the ducted-fan). The direction of the deflections in FIG. 4B shows the positive sense for each vane's deflection; negative deflections in subsequent equations imply the vane deflecting in the opposite direction. As such, the lift force generated by the deflection is in the opposite direction to the arrows. Collectively, the lift forces resulting from the deflections may generate a control moment along one of the axes.

More specifically, the deflection along a particular one of the flight axes may be stated in terms of the deflection created by vanes 402-408. Thus, if the deflection by each of vanes 402-408 is equal to d1, d2, d3, and d4, respectively, then the deflection to create moments along the roll-axis, pitch-axis, and yaw-axis, dX, dY, and dZ, respectively, is given by the following equations:

$$dX = \tfrac{1}{4} * (d1 + d2 - d3 - d4)$$

$$dY = \tfrac{1}{4} * (d1 + d2 + d3 + d4)$$

$$dZ = \tfrac{1}{4} * (-d1 + d2 + d3 - d4)$$

These deflections, dX, dY, and dZ may also be referred to as "aileron", "elevator", and "rudder" deflections, respectively, as they are traditionally associated with control moments about the roll, pitch and yaw axes. Likewise, the deflection created by each vane 402-408 may be stated in terms of the deflection associated with the flight axes by the following equations:

$$d1 = dX + dY - dZ$$

$$d2 = dX + dY + dZ$$

$$d3 = -dX + dY + dZ$$

$$d4 = -dX + dY - dZ$$

The moments created by deflections dX, dY and dZ are for the most part, linearly independent. Thus, combining deflections dX, dY, and dZ will result in a net moment that is substantially the same as the sum of the moments about the flight axes that would be produced by deflections dX, dY, and dZ in isolation. Thus, the control moment is substantially equal to the moment produced by summing the control moment vectors created by the deflections of each of the vanes 402-408.

For example, FIG. 4A shows an arrangement where vanes 402-408 are deflected in such a way to create a negative maximum moment 412 along the roll-axis. Specifically, the trailing edge of vane 402 is moved clockwise, vane 404 is moved counter-clockwise, vane 406 is moved clockwise, and vane 408 is moved counter-clockwise, generating moments corresponding to d1, d2, −d3, and −d4, respectively. Therefore, the deflection creating the control moment is equal to ¼*(d1+d2−d3−d4)=(dX+dY−dZ)/4+(dX+dY+dZ)/4−(−dX+dY−dZ)/4−(−dX+dY−dZ)/4=dX. Thus, in this configuration, the moments along the pitch-axis (dY) and yaw-axis (dZ) offset each other and are substantially negated, resulting in a combined moment (i.e., maximum moment 412) along the roll-axis (dX).

As another example, FIG. 4B shows an arrangement where the vanes are deflected in such a way to create a negative maximum moment 414 along the pitch-axis. Specifically, the trailing edge of vane 402 is moved clockwise, vane 404 is moved counter-clockwise, vane 406 is moved counter-clockwise, and vane 408 is moved clockwise, generating moments corresponding to d1, d3, d2, and d4, respectively. Therefore, the deflection creating the control moment is equal to ¼*(d1+d2+d3+d4)=(dX+dY−dZ)/4+(dX+dY+dZ)/4+(−dX+dY−dZ)/4+(−dX+dY−dZ)/4=dY. Thus, in this configuration, the vane deflections along the roll-axis (dX) and yaw-axis (dZ)

offset each other and are substantially negated, resulting in a combined moment (i.e., maximum moment 414) along the pitch-axis (dY).

And as another example, FIG. 4C shows an arrangement where the vanes are deflected in such a way to create a negative maximum moment (not shown) along the yaw-axis. Specifically, the trailing edge of vane 402 is moved counter-clockwise, vane 404 is moved counter-clockwise, vane 406 is moved counter-clockwise, and vane 408 is moved counter-clockwise, generating moments corresponding to −d1, d3, d2, and −d4, respectively. Therefore, the deflection creating the control moment is equal to ¼*(−d1+d2+d3−d4)=−(dX+dY−dZ)/4+(dX+dY+dZ)/4+(−dX+dY−dZ)/4−(−dX+dY−dZ)/4=dZ. Thus, in this configuration, the vane deflections along the roll-axis (dX) and pitch-axis (dY) offset each other and are substantially negated, resulting in a combined moment along the yaw-axis (dZ).

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

I claim:

1. A propulsion system for an air-vehicle, the propulsion system comprising:
   a power source;
   a ducted-fan that is powered by the power source and configured to create an air flow through a duct; and
   a plurality of vanes configured to produce control moments by deflecting the air flow created by the ducted-fan, each vane of the plurality of vanes defining a vane axis that is aligned with a moment created by the respective vane, wherein the vanes of the plurality of vanes are arranged in an x-clocked configuration in which the vane axes of at least two of the vanes are oriented at approximately 45 degrees relative to a flight axis of the air vehicle.

2. The propulsion system of claim 1 wherein the power source is a gas engine or an electric motor.

3. The propulsion system of claim 1, wherein the air-vehicle is a ducted-fan organic air-vehicle.

4. The propulsion system of claim 1, wherein the air flow provides thrust and lift for the air-vehicle.

5. The propulsion system of claim 1, wherein each vane is independently moveable.

6. The propulsion system of claim 1, wherein the air-vehicle has an associated direction of flight, wherein the direction of flight defines a set of flight axes including the flight axis, and wherein the vane axes of the vanes of the plurality of vanes are oriented at approximately forty-five degrees to the flight axes.

7. The propulsion system of claim 1, wherein each vane comprises a set of sub-vanes, wherein the sub-vanes in each set are arranged substantially parallel to each other.

8. The propulsion system of claim 1, wherein the plurality of vanes arranged in an x-clocked configuration comprises four vanes arranged perpendicular to each other.

9. The propulsion system of claim 8, wherein each of the vanes creates a control moment, wherein the effect of control moments created by all the vanes is a combined control moment, and wherein the vanes are configurable so that the combined moment is a maximum moment of the x-clocked configuration.

10. The propulsion system of claim 9, wherein the maximum moment created by the vanes of the plurality of vanes of the x-clocked configuration is aligned with at least one flight axis of the air vehicle.

11. The propulsion system of claim 9, wherein the air-vehicle has a maximum moment of inertia, and wherein the maximum moment created by the vanes of the plurality of vanes of the x-clocked configuration is aligned with a principle axis of the maximum moment of inertia.

12. The propulsion system of claim 1, wherein the plurality of vanes comprises a plurality of flapped vanes, wherein each flapped vane is moveable to control deflection of the air flow through the ducted-fan.

13. A ducted-fan air-vehicle comprising:
    a power source;
    a duct;
    a fan located within the duct and powered by the power source, wherein the fan is configured to create air flow through the duct; and
    a plurality of vanes arranged in an x-clocked configuration in which a maximum control moment created by vanes of the plurality of vanes is aligned with a flight axis of the air-vehicle, wherein the vanes of the plurality of vanes are configured to produce control moments by deflecting the air flow through the duct.

14. The ducted-fan air-vehicle of claim 13, wherein the ducted-fan air-vehicle further comprises an avionics system to control the flight of the ducted-fan air-vehicle.

15. The ducted-fan air-vehicle of claim 14, wherein the avionics system is configured to orient the vehicle around a forward direction of flight, wherein the forward direction of flight defines a set of flight axes comprising the flight axis, the flight axis being one of a forward flight axis, a roll-axis, a pitch-axis, and a yaw-axis, wherein the roll-axis is oriented substantially parallel to the forward flight axis and the pitch-axis is oriented substantially perpendicular to the forward flight axis.

16. The ducted-fan air-vehicle of claim 13, wherein the plurality of vanes arranged in the x-clocked configuration comprises four vanes arranged perpendicular to each other such that each vane is aligned with a vane axis, wherein each vane axis is oriented at substantially forty-five degrees to at least one flight axis of the air vehicle.

17. The ducted-fan air-vehicle of claim 13, wherein the plurality of vanes comprises a plurality of flapped vanes, wherein each flapped vane is independently moveable to control deflection of the air flow through the ducted-fan.

18. The propulsion system of claim 1, wherein a maximum control moment created by the vanes of the plurality of vanes is aligned with a flight axis of the air-vehicle.

19. The ducted-fan air-vehicle of claim 13, wherein the vanes of the plurality of vanes each define a vane axis that is aligned with a moment created by the respective vane, and wherein the vane axes of at least two of the vanes are oriented approximately 45 degrees relative to a flight axis of the air vehicle.

* * * * *